US011522910B1

(12) United States Patent
Frankston et al.

(10) Patent No.: US 11,522,910 B1
(45) Date of Patent: Dec. 6, 2022

(54) WORKFLOW TRIGGER GENERATION

(71) Applicant: Rapid7, Inc., Boston, MA (US)

(72) Inventors: Jared Frankston, Boston, MA (US); James Golin, Boston, MA (US); Samantha Goresh, Somerville, MA (US); Tyler Terenzoni, Boston, MA (US)

(73) Assignee: Rapid7, Inc., Boston, MA (US)

( * ) Notice: Subject to any disclaimer, the term of this patent is extended or adjusted under 35 U.S.C. 154(b) by 293 days.

(21) Appl. No.: 16/691,230

(22) Filed: Nov. 21, 2019

(51) Int. Cl.
*H04L 9/40* (2022.01)
*G06F 16/28* (2019.01)

(52) U.S. Cl.
CPC ........ *H04L 63/1466* (2013.01); *G06F 16/289* (2019.01); *H04L 63/1416* (2013.01)

(58) Field of Classification Search
CPC ............. H04L 63/1466; H04L 63/1416; G06F 16/289
See application file for complete search history.

(56) References Cited

U.S. PATENT DOCUMENTS

| 10,250,627 | B2* | 4/2019 | Mont | H04L 41/28 |
| 2015/0095057 | A1* | 4/2015 | Woodard, Sr. | G16Z 99/00 705/2 |
| 2016/0021138 | A1* | 1/2016 | McGloin | G06F 16/1744 726/23 |
| 2017/0024187 | A1* | 1/2017 | Snell | G06F 7/26 |
| 2017/0206483 | A1* | 7/2017 | Fable | G06Q 10/06 705/7 |
| 2018/0357094 | A1* | 12/2018 | Kim | G06F 3/0486 |
| 2019/0324893 | A1* | 10/2019 | Vaishnav | G06N 20/00 717/125 |

FOREIGN PATENT DOCUMENTS

WO    WO-2016018369 A1 *  2/2016 ............ H04W 12/06

\* cited by examiner

*Primary Examiner* — Daniel B Potratz
*Assistant Examiner* — Matthias Habtegeorgis
(74) *Attorney, Agent, or Firm* — Ashwind Anand (57) ABSTRACT

Methods and systems for initiating a workflow are disclosed. The systems and methods described herein may receive as input a data segment from an external source, and identify at least one type of data object present in the data segment. The systems and methods described herein may then autonomously generate an application programming interface (API) trigger to initiate a workflow, wherein the API trigger is based on the at least one type of data object present in the data segment.

18 Claims, 7 Drawing Sheets

Enter JSON
```
1  {
2    "id": "Unprocessable Entity",
3    "links": {
4      "about": "https:\/\/\/www.abuseipdb.com\/\/api"
5    },
6    "status": "422",
7    "code": "1002",
8    "title": "The request was well-formed but was unable to be followed due to semantic errors.",
9    "detail": "We expected an IPv4 or IPv6 address (e.g. 8.8.8.8)."
10
```

FIG. 4

```
import lang from 'lodash';

function getType(unknown) {
  if (lang.isArray(unknown)) {
    return 'array';
  } else if (lang.isObject(unknown)) {
    return 'object';
  } else if (lang.isNumber(unknown)) {
    return 'number';
  } else if (lang.isBoolean(unknown)) {
    return 'boolean';
  } else if (lang.isString(unknown)) {
    return 'string';
  }
  return 'object';
}
```

FIG. 5

```
export default function getTriggerSchema(unknown) {
  const schema = [];
  for (const prop in unknown) {
    if (unknown.hasOwnProperty(prop)) {
      let scheme = {
        'error': '',
        'name': prop,
        'title': prop,
      };
      const type = getType(unknown[prop]);
      switch (type) {
        case 'object':
          scheme.type = type;
          if (prop === '0') {
            scheme = getTriggerSchema(unknown[prop]);
          } else {
            scheme.variables = getTriggerSchema(unknown[prop]);
          }
          break;
        case 'array':
          // Assumption: All items in the array are the same type
          scheme.type = type;
          if (unknown[prop].length === 0) {
            scheme.items = { 'type': 'string' };
          } else {
            const secondaryType = getType(unknown[prop][0]);
            if (secondaryType === 'object') {
              scheme.items = { 'type': secondaryType, 'variables': getTriggerSchema(unknown[prop])[0] };
            } else {
              scheme.items = { 'type': secondaryType };
            }
          }
          break;
        case 'boolean':
          scheme.type = type;
          break;
        case 'number':
          scheme.type = type;
          break;

case 'string':
          scheme.type = type;
          scheme.format = '';
          break;

default:
          break;
      }
      schema.push(scheme);
    }
  }
  return schema;
}
```

WORKFLOW TRIGGER GENERATION

TECHNICAL FIELD

Embodiments described herein generally relate to methods and systems for reviewing software code and, more particularly but not exclusively, to methods and systems for reviewing software code to initiate a workflow.

BACKGROUND

Computing processes or workflows are generally initiated with some type of trigger. Triggers are often associated with a network or a device thereon and initiate designated workflows if and when a specified activity occurs.

Often times a vendor, client, or other type of entity needs to integrate external data into their systems or processes, in which case the receipt of external data (e.g., a portion thereof) would serve as a trigger. However, integration often involves extremely large data sets, and manually integrating large sets of data using a client user interface is often time consuming and resource intensive.

A need exists, therefore, for systems and methods for overcoming the disadvantages of existing techniques by automating workflow integration.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method of initiating a workflow. The method includes receiving, at an interface, a data segment; identifying, using a processor executing instructions stored on memory, at least one type of data object present in the data segment; and autonomously generating, using the processor, an application programming interface (API) trigger to initiate a workflow, wherein the API trigger is based on the at least one type of data object present in the data segment.

In some embodiments, the at least one data object comprises a key and a paired value, and identifying the type of data object includes traversing the data segment to identify the key and the paired value in the data segment, executing a type-identification function to identify a type of the paired value, and associating the identified type with the key. In some embodiments, the method further includes recursively iterating these steps against remaining data objects in the data segment. In some embodiments, the type of the key is an object, an array, a string, a number, or a Boolean value.

In some embodiments, the initiated workflow includes at least one of a threat remediation procedure, a ticket generation procedure, and a data enhancement procedure. In some embodiments, the threat remediation procedure includes at least one of disabling a user, quarantining a network device, and issuing an alert.

In some embodiments, the method further includes receiving an alert that the data segment is malformed.

In some embodiments, receiving the data segment comprises receiving the data segment at the interface via at least one of a paste operation and by a manual-type operation.

In some embodiments, the generated API trigger is a representational state transfer (REST) trigger.

In some embodiments, the data segment is a JavaScript Object Notation (JSON) blob.

In some embodiments, the method further includes presenting a display of the at least one data object present in the data segment.

According to another aspect, embodiments relate to a system for initiating a workflow. The system includes an interface for at least receiving a data segment; and a processor executing instructions stored on memory and configured to: identify at least one type of data object present in the data segment, and autonomously generate an application programming interface (API) trigger to initiate a workflow, wherein the API trigger is based on the at least one type of data object present in the data segment.

In some embodiments, the at least one type of data object comprises a key and a paired value and the processor is further configured to traverse the data segment to identify the key and the paired value in the data segment, execute a type-identification function to identify a type of the paired value, and associate the identified type with the key. In some embodiments, the processor is further configured to recursively iterate these steps against remaining data objects in the data segment. In some embodiments, the type of the key is an object, an array, a string, a number, or a Boolean value.

In some embodiments, the initiated workflow includes at least one of a threat remediation procedure, a ticket generation procedure, and a data enhancement procedure. In some embodiments, the threat remediation procedure includes at least one of disabling a user, quarantining a network device, and issuing an alert.

In some embodiments, the interface is further configured to receive an alert that the data segment is malformed.

In some embodiments, the interface receives the data segment via at least one of a paste operation and by a manual-type operation.

In some embodiments, the generated API trigger is a representational state transfer (REST) trigger.

In some embodiments, the data segment is a JavaScript Object Notation (JSON) blob.

In some embodiments, the system further includes a user interface configured to present a display of the at least one data object present in the data segment.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

In accordance with the embodiments described herein, triggers and their associated workflows may be visualized as nodes in a directed graph. In these graphs, each node may represent a pre-built function that requires a user to define an input and, based on the input, provides an output to be used later in the graph. Execution of a workflow occurs by sending input data to the root node of the directed graph. Thereafter, the directed graph is traversed with node functions being executed in order.

Figure 1A:
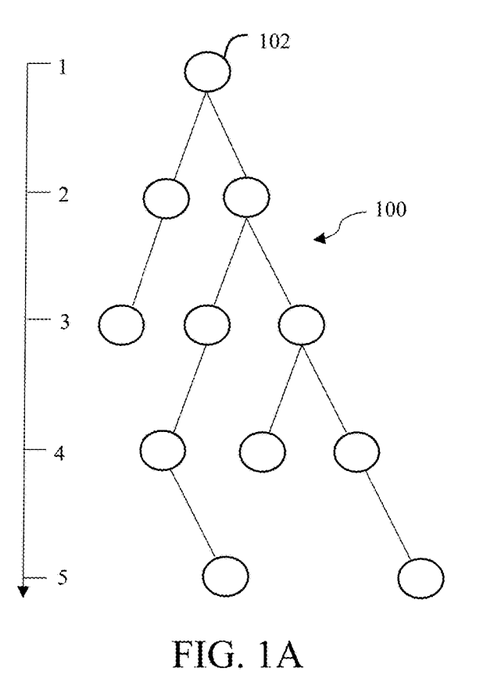
FIGS. 1A & B illustrate directed graphs of a workflow in accordance with one embodiment.

For example, FIG. 1A illustrates a directed graph 100 showing a workflow. In FIG. 1A, the steps of the workflow are represented by nodes 102. Every workflow such as that represented by graph 100 begins with a trigger. Triggers listen for certain behavior and initiate workflows when the behavior is detected.

Figure 1B:
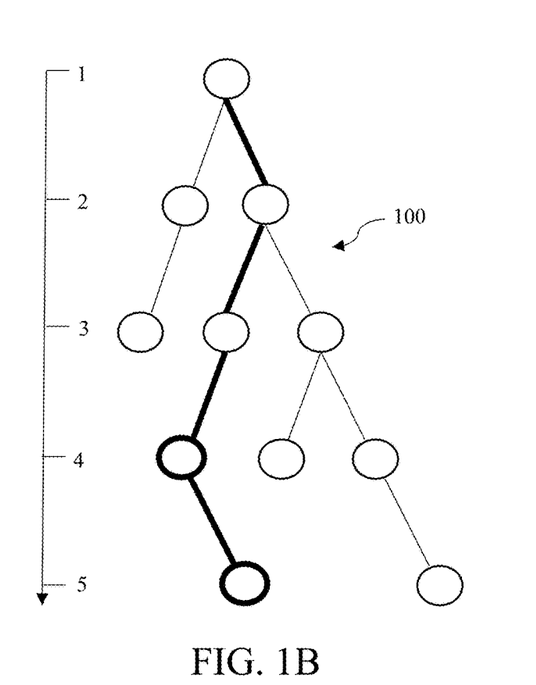

For this workflow, the trigger may involve node 102 at level 1 receiving some input that satisfies some condition so as to initiate a second step in the workflow. As seen in FIG. 1B, certain nodes of the directed graph 100 are traversed (illustrated by darkened links) to complete the workflow.

Oftentimes these workflows are designed by a vendor or service provider, and the trigger may be some data or action associated with a third party. However, manually integrating one or more workflows with third party software, which may include data with hundreds of keys, may require several hours to enter the received data using a user interface.

Oftentimes, the software to be integrated will include data exported in JSON form. A JSON blob is a raw JSON object representing the structure of data to be ingested via a defined trigger. A JSON object generally includes a plurality of key-value pairs. An exemplary JSON object may be {"name": "Tom", "sex": "male", "age": "30"}. In this particular JSON object, the "name" field is a key, and "Tom" is the corresponding value. Together, these components of the JSON object represent a key-value pair.

The systems and methods described herein allow a user to insert, by a copy-and-paste operation or a manual-type operation, a JSON blob or other type of data segment to automatically create the structure of an API trigger (i.e., a root node) in a workflow. In some embodiments, the API trigger is a representational state transfer (REST) trigger.

In accordance with the embodiments described herein, the types of the JSON blobs are automatically inferred and populated in a UI to create a trigger. The systems and methods described herein make this inference by recursively iterating over the keys in a JSON blob using a tool such as Lodash.js. Lodash is a javascript library that may be leveraged to determine the type of each key.

The embodiments described herein auto-generate an API trigger based on a JSON blob (or other type of data segment) often received from a third party data source. This auto-generated root node input can be used to create further enrichment on security alerts, and take appropriate actions including, but not limited to, disabling users, quarantining devices, and alerting security personnel of any potential malicious activity. Many security products are capable of exporting alerts as JSON, and the systems and methods described herein allow for the efficient importation of the alerts into another piece of software having one or more workflows, such as defense software.

The embodiments described herein offer a number of advantages over existing techniques and systems. The systems and methods herein may automatically infer the type of a key in a JSON blob or other type of data segment, visually display the structure of the JSON blob structure in a user interface, create REST API triggers from the JSON blob structure, and automatically validate a JSON blob and inform a user if the JSON blob is malformed.

Figure 2:
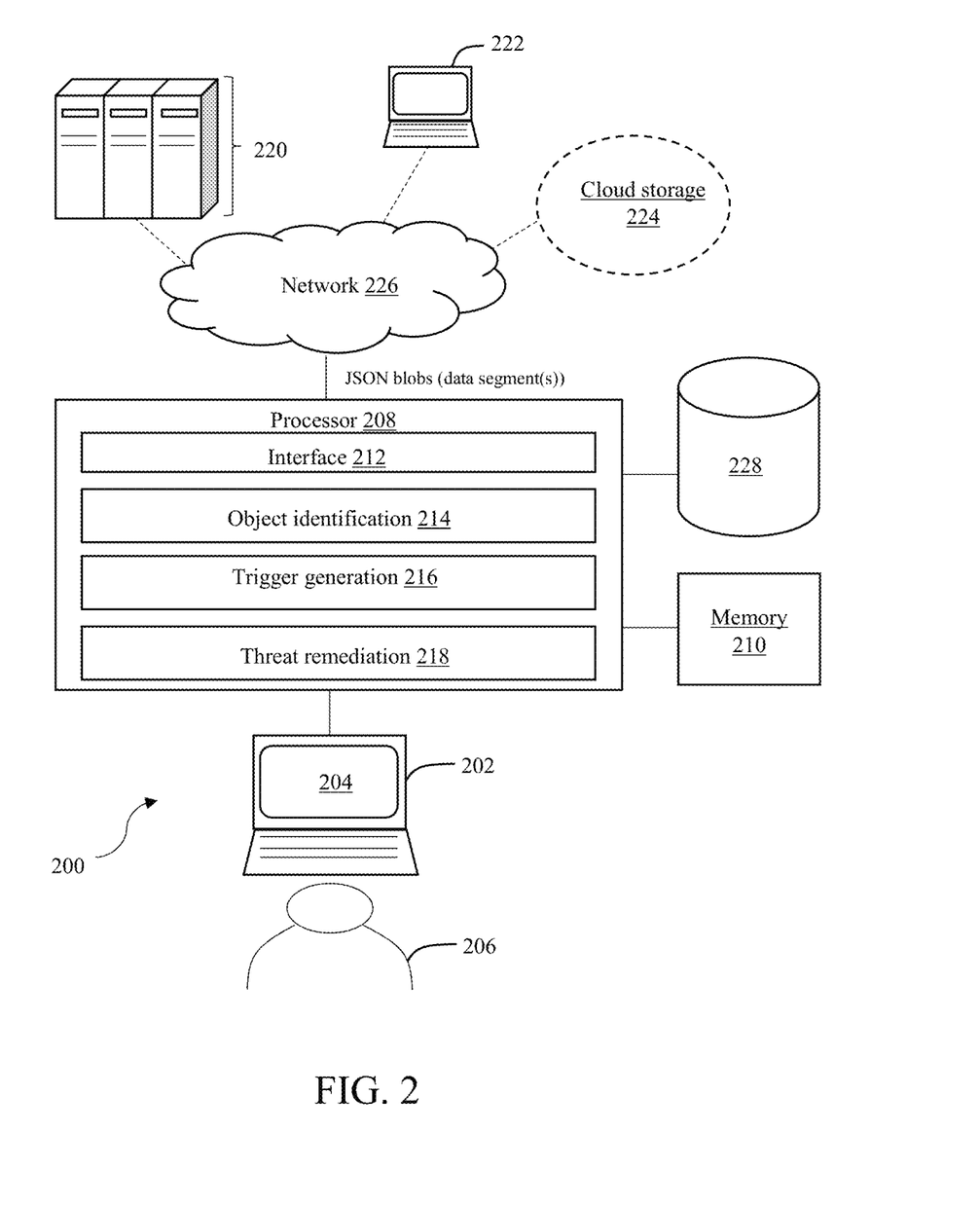
FIG. 2 illustrates a system for initiating a workflow in accordance with one embodiment.

FIG. 2 illustrates a system 200 for initiating a workflow in accordance with one embodiment. The system 200 may include a user device 202 executing a user interface 204 for presentation to one or more users 206 interested in configuring a workflow.

The user device 202 may be any hardware device capable of executing the user interface 204. The user device 202 may be configured as a laptop, PC, tablet, mobile device, or the like. The exact configuration of the user device 202 may vary as long as it can execute and present the user interface 204 to the user 206. The user interface 204 may allow the user to, for example, define triggers, review JSON blobs and components thereof, and view the execution of one or more workflows.

The user device 202 may be in operable communication with one or more processors 208. The processor(s) 208 may be any hardware device capable of executing instructions stored on memory 210 to accomplish the objectives of the various embodiments described herein. The processor(s) 208 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 208 may be configured as part of the user device 202 on which the user interface 204 executes, such as a laptop, or may be located on a different computing device, perhaps at some remote location.

The processor 208 may execute instructions stored on memory 210 to provide various modules to accomplish the objectives of the various embodiments described herein. Specifically, the processor 208 may execute or otherwise include an interface 212, an object identification module 214, and a trigger generation module 216, and a threat remediation module 218.

The memory 210 may be L1, L2, or L3 cache or RAM memory configurations. The memory 210 may include non-volatile memory such as flash memory, EPROM, EEPROM, ROM, and PROM, or volatile memory such as static or dynamic RAM, as discussed above. The exact configuration/type of memory 210 may of course vary as long as instructions for initiating a workflow can be executed by the processor 208 to accomplish the objectives of various embodiments described herein. As shown, embodiments of the workflow system may also include a persistent storage device or database 228, which may be used to store executable instructions or other data used by the system.

The interface 212 may receive JSON blobs or other types of data segments from one or more clients 220, 222, and 224 over one or more networks 226. The clients 220, 222, and 224 may include servers, devices, storages, or the like, that are associated with clients or customers of a vendor or service provider. For example, the clients 220, 222, and 224 may have hired a vendor associated with the processor 208 to perform some type of analysis on their exported data.

The interface 212 may receive JSON blobs singularly or in batches or otherwise at predetermined time intervals. For example, data may be communicated to the interface 212 once every hour. The frequency at which data is sent over the network(s) 226 to the interface 212 may vary and may be determined or set by the user 206 or personnel associated with the clients 220, 222, and 224.

The network(s) 226 may link the various assets and components with various types of network connections. The network(s) 226 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 226 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

Figure 3:
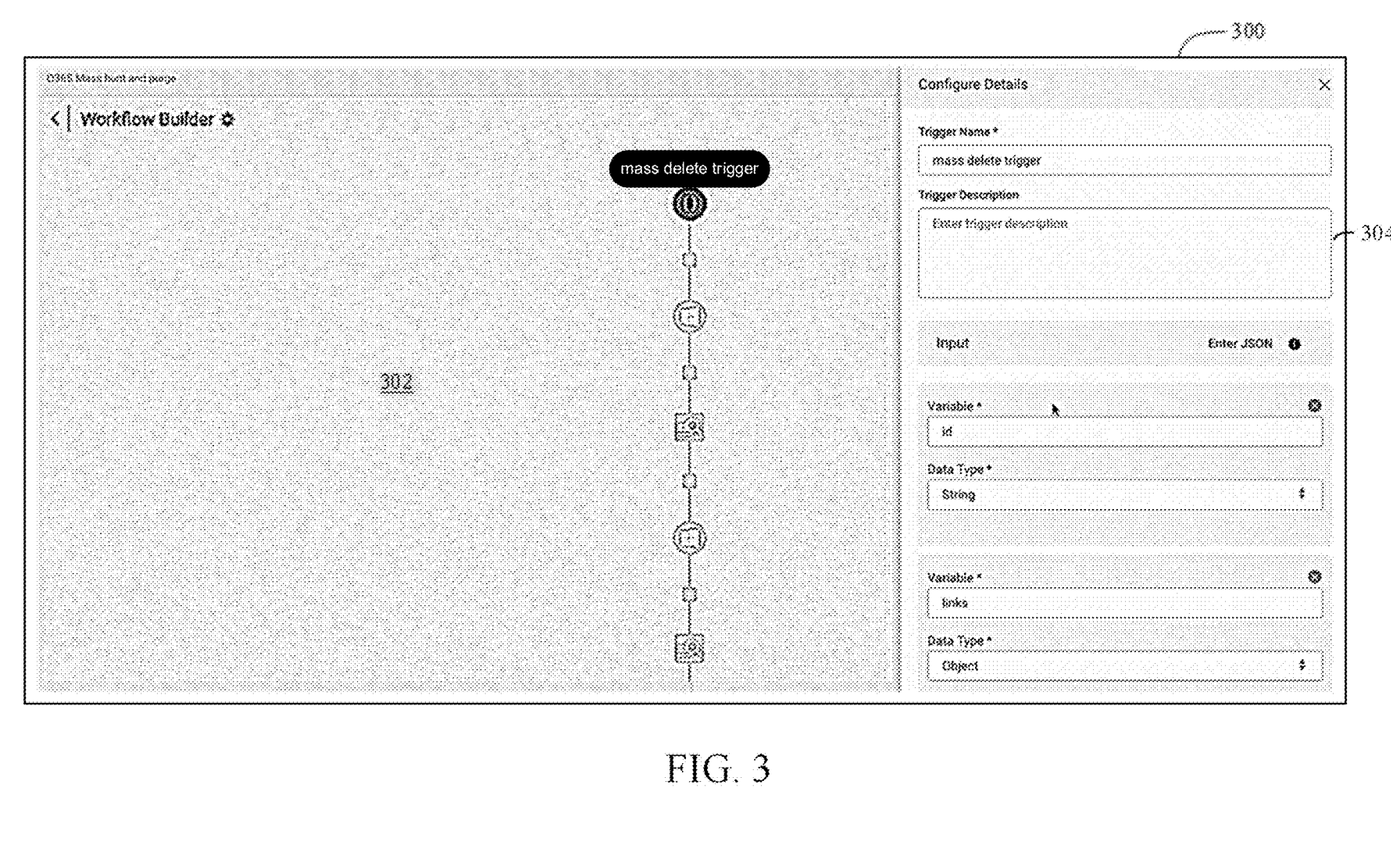
FIG. 3 presents a screenshot of an exemplary administrative panel of a user interface in accordance with one embodiment.

The user interface 204 may present an administrative panel to enable the user 206 to input and review data regarding a JSON blob. For example, FIG. 3 presents a screenshot 300 of an exemplary administrative panel 302 for presentation to a user such as the user 206 of FIG. 2. As seen in FIG. 3, the administrative panel 302 may include an input portion 304 in which the user 206 can paste or otherwise input a JSON blob.

The object identification module 214 may analyze the received JSON blob to identify objects therein. For instance, the object identification module may first confirm the validity of the JSON blob and return an error message if the JSON blob is malformed.

Figure 4:
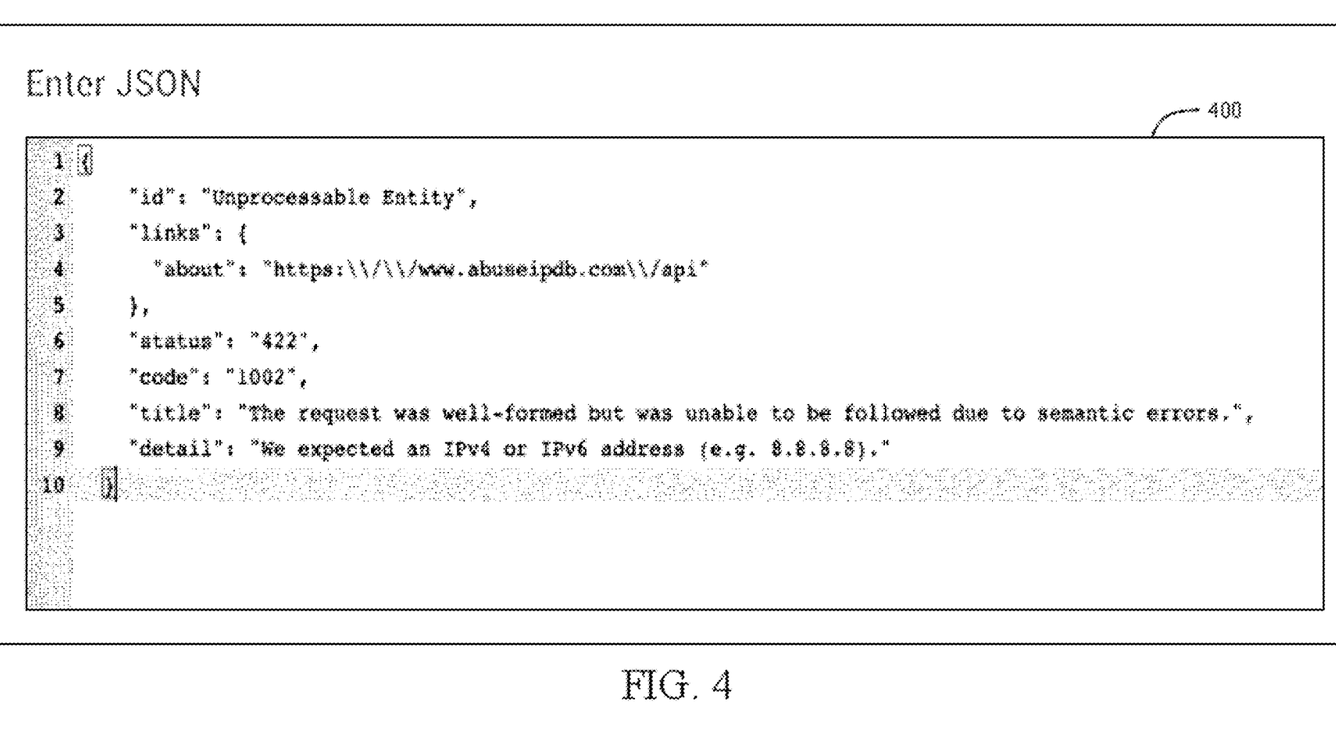
FIG. 4 presents a command window in accordance with one embodiment.

For example, FIG. 4 presents a command window 400 that includes a message informing a user that the received JSON blob is malformed. This may occur if an expected piece of data in the JSON blob was missing. For example, and as discussed above, JSON blobs include key-value pairs. Accordingly, if one component of the pair is missing, the JSON blob may be classified as malformed.

Additionally, the objection identification module 214 may identify objects, arrays, strings, numbers, Booleans, etc., that may be present in the received JSON blob. To infer components within the JSON blob, the object identification module 214 may rely on databases or libraries such as Lodash.js.

Additionally, the object identification module 214 may identify objects, arrays, strings, numbers, Booleans, etc., that may be present in the received JSON blob. To infer components within the JSON blob, the object identification module 214 may rely on databases or libraries such as Lodash.js.

Figure 5:
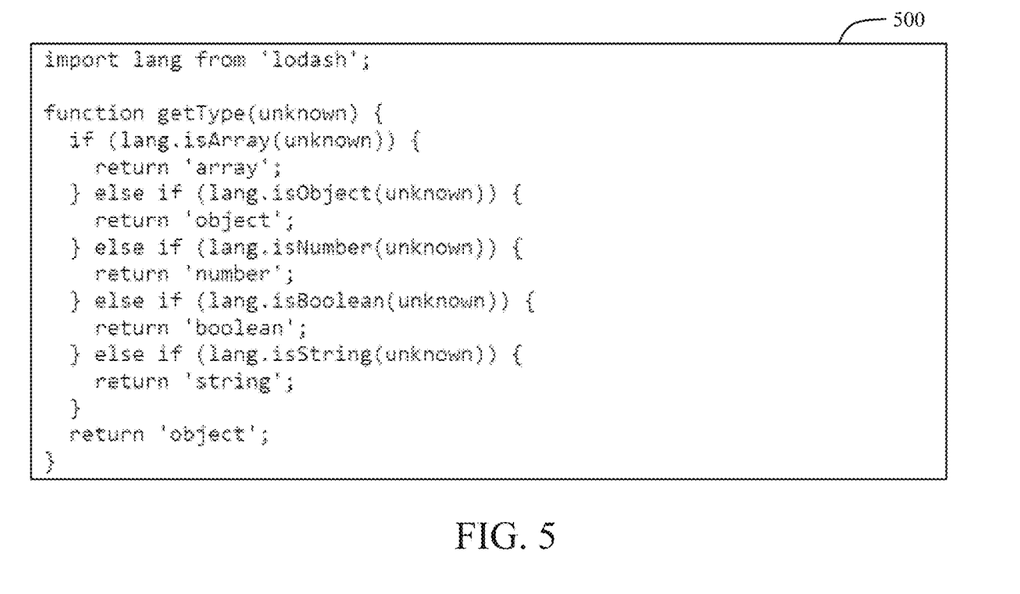
FIG. 5 presents an exemplary code portion to infer the type of each key in a JSON blob in accordance with one embodiment.

To perform these steps, the object identification module 214 may execute the code portion 500 of FIG. 5, in which a getType( ) function is executed to infer the type of each key in a JSON blob. Furthermore, the object identification module 214 may recursively analyze the structure of a received JSON blob to determine the type of each key therein. As seen in FIG. 5, the code portion 500 may rely on Lodash or some other library stored in memory 210 or otherwise accessible by the processor 208 to help identify the type of value.

Figure 6:
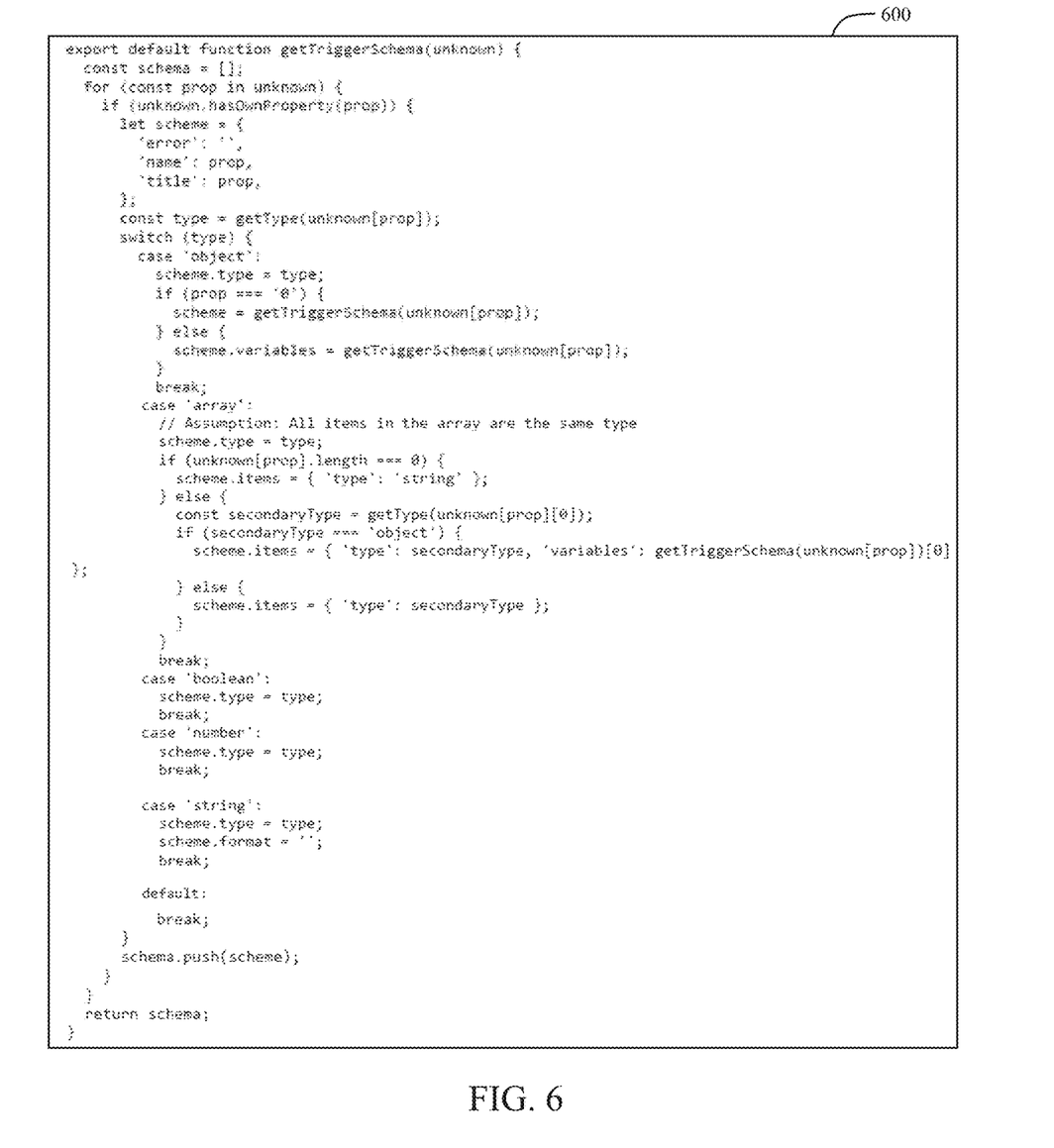
FIG. 6 presents an exemplary code portion to perform some action(s) based on determined value types of a JSON blob in accordance with one embodiment.

The trigger generation module 216 may then execute the code portion 600 of FIG. 6 to create one or more API triggers for the workflow 100 based on the determined value type(s). Essentially, the identified values and their types may serve as the trigger to some workflow as discussed above. In some embodiments, these triggers may initiate a trigger in a representational state transfer (REST) workflow.

The received JSON blobs may include data relevant to the security of a client 220, 222, or 224, and the workflow 100 may be configured to execute some threat mitigation procedure upon activation of a trigger by data indicative of, e.g., malicious activity. Accordingly, the workflow 100 may execute the threat remediation module 218 to perform some remedial action upon detecting data indicative of malicious activity that trips the API trigger. The remedial action may include, but is not limited to, any one or more of disabling a user, quarantining a network device, and issuing an alert. Any issued alerts may be in the form of a visual alert, a text alert, an audio alert, a haptic-based alert, or some combination thereof.

The workflow 100 is not limited to performing threat remediation procedures, either. Rather, the trigger generation module 216 may autonomously initiate any type of workflow. These may include, for example, a data enrichment procedure, a ticket generation procedure (instructing a user 206 to perform some action), or the like.

Figure 7:
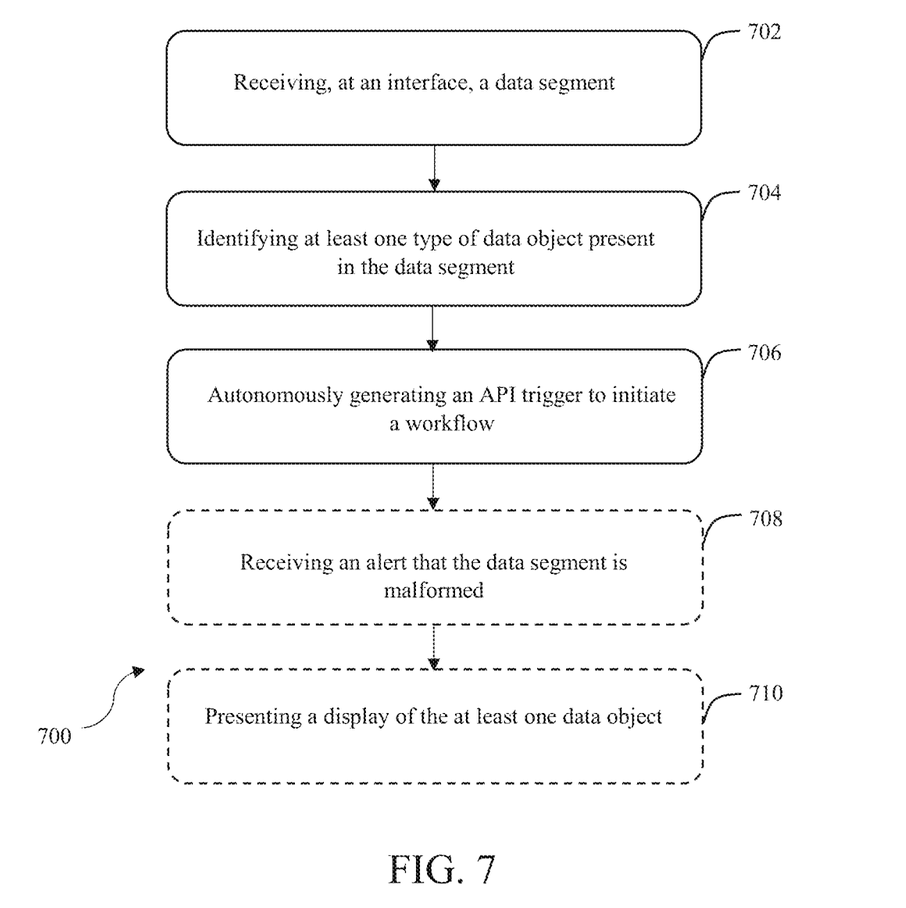
FIG. 7 depicts a flowchart of a method for initiating a workflow in accordance with one embodiment.

FIG. 7 depicts a flowchart of a method 700 of autonomously instantiating a workflow in accordance with one embodiment. The system 200 of FIG. 2 or components thereof may perform the steps of method 700.

Step 702 involves receiving, at an interface, a data segment. The data segment may be received via at least one of a paste operation and by a manual-type operation. This data segment may be from a client and may relate to some activity associated with the client's network. In some embodiments, the received data segment may be a JSON blob.

In some embodiments, a vendor or service provider may be tasked with reviewing data segments from one or more clients. These data segments may be communicated to the vendor or service provider in batches, such as at predetermined time intervals (e.g., once every 15 minutes, once every hour, at the end of each day, etc.).

In these scenarios, in accordance with existing techniques, the vendor or service provider would have to spend an extraordinary amount of time ingesting this data from their clients. The amount of time required would increase based on the frequency of data transmittals, the amount of data transmitted at each interval, the number of clients, or the like.

Step 704 involves identifying, using a processor executing instructions stored on memory, at least one type of data object present in the data segment. An object identification module such as the object identification module 214 may traverse the structure of the received data segment (e.g., a JSON blob) to determine keys, value, and data types.

The object identification module 214 may support or otherwise identify a variety of different types of data. These may include, but are not limited to, objects, arrays, numbers, Booleans, strings, or the like. For example, the object identification module 214 may execute a type-identification function (e.g., getType( )) to identify a type of the paired value.

Step 706 involves autonomously generating, using the processor, an application programming interface (API) trigger to initiate a workflow, wherein the API trigger is based on the at least one type of data object present in the data segment. The type of workflow executed may vary and may depend on a variety of factors. These factors may include, but are not limited to, the type of trigger, the client, the authorizations of the vendor or service provider, or the like. The workflow may involve a threat mitigation procedure, a data enrichment procedure, or a ticketing procedure. For example, a security team may create a ticket to inform others of data detected in a JSON blob. This list of workflows is merely exemplary, and other types of workflows may be initiated as a result of a detected trigger.

Step 708 is optional and involves receiving an alert that the data segment is malformed. As discussed previously, oftentimes a received data segment may be malformed or otherwise appear differently than what is expected. Accordingly, method 700 may involve informing a user that a received data segment is malformed and invite the user to take steps to remediate the defect to facilitate the remainder of the process and the creation of the workflow. In some embodiments, a message such as the message of FIG. 4 may be presented to a user.

Step 710 is optional and involves presenting a display of the at least one data object. A user interface such as the user interface 204 may present data regarding the JSON blob to a user 206 in an easy-to-understand graphical format. Accordingly, the user 206 may view data regarding the JSON blob, such as keys and their values, as well as the type of workflow to be initiated.

Various embodiments are described with reference to the accompanying drawings, which form a part hereof, and which show specific exemplary embodiments. However, the concepts of the present disclosure may be implemented in many different forms and should not be construed as limited to the embodiments described herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The previous detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the previous disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the preceding description are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the previous discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the preceding description. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
receiving, at an interface, a data segment;
identifying, using a processor executing instructions stored on memory, at least one type of data object present in the data segment, wherein the data segment comprises a key and a paired value, and
wherein the identifying comprises:
traversing the data segment to identify the key and the paired value;
executing a type-identification function to identify the at least one type of the paired value, wherein the type-identification function is used to identify the at least one type from a set of types comprising at least one of:
an object,
an array,
a string,
a number, or
a Boolean value, and
associating the at least one type with the key; and
automatically creating, using the processor, an application programming interface (API) trigger, wherein the API trigger is created based at least in part on the at least one type of data object present in the data segment, and
wherein the API trigger is used to initiate a workflow.

2. The method of claim 1 further comprising traversing the data segment recursively and associating additional keys in the data segment with respective identified types.

3. The method of claim 1 wherein the initiated workflow includes at least one of a threat remediation procedure, a ticket generation procedure, and a data enhancement procedure.

4. The method of claim 3 wherein the threat remediation procedure includes at least one of disabling a user, quarantining a network device, and issuing an alert.

5. The method of claim 1 further comprising receiving an alert that the data segment is malformed.

6. The method of claim 1 wherein receiving the data segment comprises receiving the data segment at the interface via at least one of a paste operation and by a manual-type operation.

7. The method of claim 1 wherein the API trigger is a representational state transfer (REST) trigger.

8. The method of claim 1 wherein the data segment is a JavaScript Object Notation (JSON) blob.

9. The method of claim 1 further comprising presenting a display of the at least one type of data object present in the data segment.

10. A system comprising:
a processor that executes instructions stored on memory, wherein the instructions cause the processor to:
implement an interface configured to receive a data segment;
identify at least one type of data object present in the data segment, wherein the data segment comprises a key and a paired value, and
wherein, to identify the at least one type of data object, the instructions cause the processor to:
traverse the data segment to identify the key and the paired value;
execute a type-identification function to identify the at least one type of the paired value, wherein the type-identification function is used to identify the at least one type from a set of types comprising at least one of:
an object,
an array,
a string,
a number, or a Boolean value, and
associate the at least one type with the key; and
automatically create an application programming interface (API) trigger, wherein the API trigger is created based at least in part on the at least one type of data object present in the data segment, and wherein the API trigger is used to initiate a workflow.

11. The system of claim 10 wherein the processor is further configured to traverse the data segment recursively and associate additional keys in the data segment with respective identified types.

12. The system of claim 10 wherein the initiated workflow includes at least one of a threat remediation procedure, a ticket generation procedure, and a data enhancement procedure.

13. The system of claim 12 wherein the threat remediation procedure includes at least one of disabling a user, quarantining a network device, and issuing an alert.

14. The system of claim 10 wherein the interface is further configured to receive an alert that the data segment is malformed.

15. The system of claim 10 wherein the interface receives the data segment via at least one of a paste operation and by a manual-type operation.

16. The system of claim 10 wherein the API trigger is a representational state transfer (REST) trigger.

17. The system of claim 10 wherein the data segment is a JavaScript Object Notation (JSON) blob.

18. The system of claim 10, further comprising a user interface configured to present a display of the at least one type of data object present in the data segment.

* * * * *